United States Patent [19]

Gates

[11] Patent Number: 4,791,805

[45] Date of Patent: Dec. 20, 1988

[54] FUEL TANK LEAK DETECTION APPARATUS

[75] Inventor: Donald C. Gates, Troy, Mich.

[73] Assignee: Expertek, Inc., Detroit, Mich.

[21] Appl. No.: 742,462

[22] Filed: Jun. 7, 1985

[51] Int. Cl.$^4$ ............................................. G01M 3/20
[52] U.S. Cl. ...................................... 73/40.7; 73/49.2
[58] Field of Search ................... 73/40.7, 49.2, 49.3, 73/45.4

[56] References Cited

U.S. PATENT DOCUMENTS

| | | | |
|---|---|---|---|
| 3,027,753 | 4/1962 | Harder | 73/40.7 |
| 3,729,983 | 5/1973 | Coppens | 73/40.7 |
| 3,762,212 | 10/1973 | Morley et al. | 73/40.7 |
| 3,813,923 | 6/1974 | Pendleton | 73/49.2 |
| 3,847,013 | 11/1974 | Luy | 73/40.7 |
| 3,949,598 | 4/1976 | Bergstrand | 73/40.7 |
| 3,956,923 | 5/1976 | Young et al. | 73/40.7 |
| 3,987,664 | 10/1976 | Hass et al. | 73/49.2 |
| 4,012,945 | 3/1977 | Bergstrand | 73/49.2 |
| 4,487,058 | 12/1984 | Mennenga | 73/40.7 |
| 4,499,752 | 2/1985 | Fruzzetti | 73/40.7 |
| 4,584,877 | 4/1986 | Brayman | 73/40.7 |

FOREIGN PATENT DOCUMENTS

| | | | |
|---|---|---|---|
| 2403360 | 8/1975 | Fed. Rep. of Germany | 73/40.7 |
| 2135751 | 4/1979 | Fed. Rep. of Germany | 73/40.7 |
| 2000300 | 1/1979 | United Kingdom | 73/40.7 |

*Primary Examiner*—Michael J. Tokar
*Assistant Examiner*—Hezron E. Williams
*Attorney, Agent, or Firm*—Harness, Dickey & Pierce

[57] ABSTRACT

A method and device for testing for leaks in fuel tanks. The method requires a vacuum be drawn around the fuel tank while a test gas is injected into the tank. Any leaks in the tank will permit the test gas to be drawn into the vacuum chamber, the output of which is tested by a sensor sensitive to the test gas. The entire test is conducted assuring speed, accuracy and safety. The tank device contains a vacuum chamber which is molded directly upon the tank to be tested, thereby minimizing the size of the vacuum chamber. The device also contains a sealing system which is adjustable. An optional addition to the system is a method of localizing a leak that is detected.

22 Claims, 8 Drawing Sheets

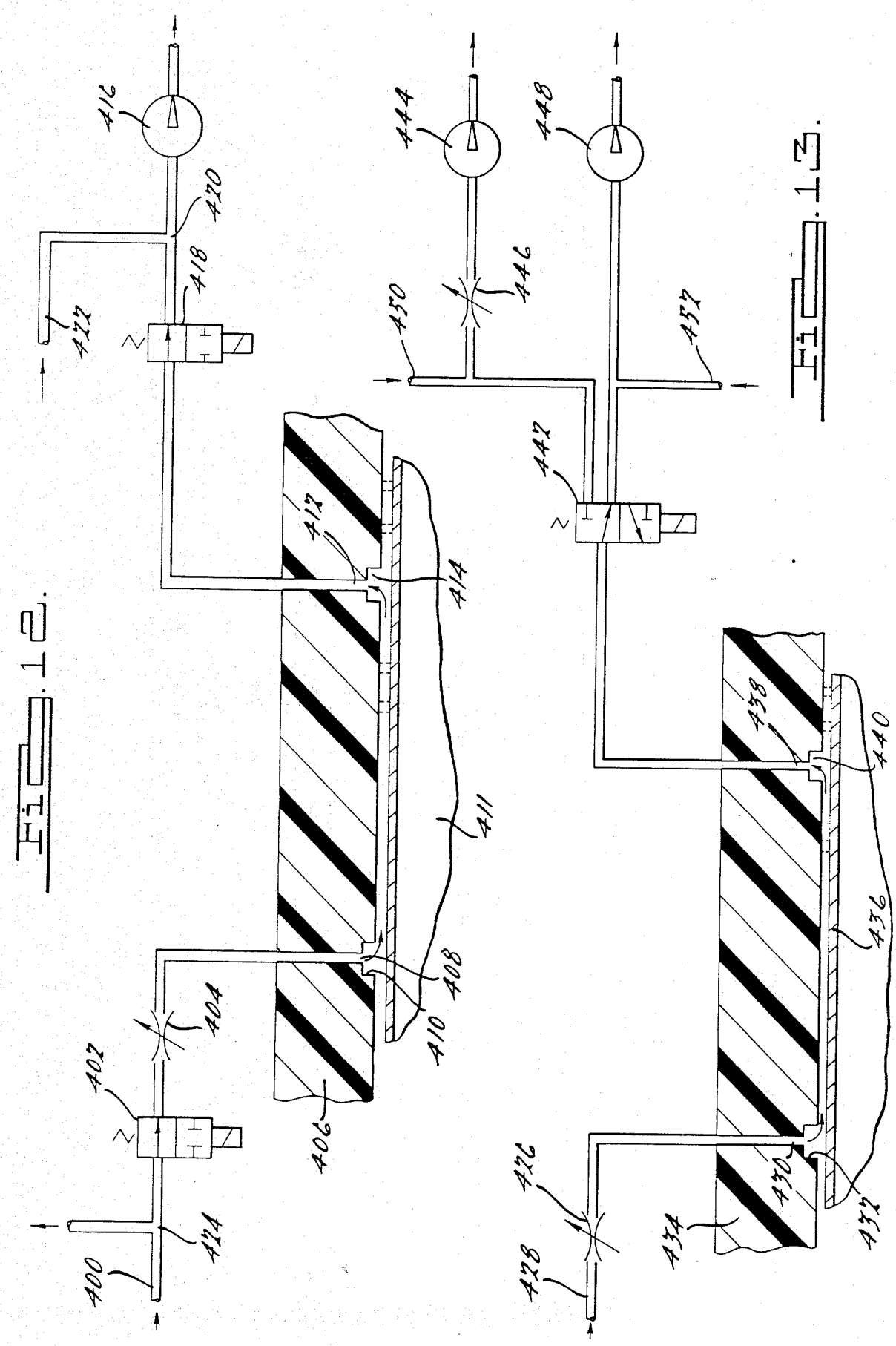

FUEL TANK LEAK DETECTION APPARATUS

BACKGROUND OF THE INVENTION

The importance of detecting leaks in fuel tanks has long been recognized by the automotive industry. Unfortunately, present methods of detecting leaks in fuel tanks are either not suited for the production line methods of the automotive industry or are not sufficiently reliable. The objective of this invention is to provide a method and apparatus for detecting leaks in a fuel tank that are highly accurate and reliable and can be utilized under factory conditions.

The present method of fuel tank leak detection used in the automotive industry is the "bubble" method. A fuel tank is submerged in water, pressurized, and then examined to see if bubbles of air escape from the tank. There are several major disadvantages to this method, the most important of which are the speed and reliability of the test. In operation, the speed and reliability of the bubble method are inexorably connected. The bubble test is conducted manually whereby a human operator will watch for bubbles arising from the submerged fuel tank. The accuracy of the test therefore, depends on the alertness of the operator of the test. The human element of this test cannot readily be eliminated, as it is difficult to have an automated unit detect bubbles arising from the tank. In addition, the bubble test is limited by its sensitivity, only bubbles of a volume of 0.04 cubic centimeters or larger are noticeable by the human eye and, therefore, smaller leaks cannot be detected. While this method has its advantages, such as flexibility of the test in that the observer may ignore leaks that are irrelevant such as from defective seals applied to the fuel tank for testing, they are outweighed by the disadvantages. Even the flexibility is adversely affected by the time constraints of the automotive industry. The faster the operator is forced to conduct the test, the less accurate he is likely to be. It is also necessary to submerge the tank in water, thereby causing the tank to be wet and requiring a drying cycle before the tank may be painted or finally assembled.

Other methods of leak detecting include mass spectrometer pressures tests and an air pressure decay test. A mass spectrometer leak test involves placing the test part in a leak tight enclosure and sealed at all ports. A high vacuum is drawn either inside the part or inside the enclosure and helium is introduced into the other which is left at atmospheric pressure. Any helium detected by a spectrometer scanning the high vacuum space indicates a leak. Although this test is highly sensitive, may be easily automated and can be operated quickly, it is a delicate system that it not suited for use in the automotive industry. Another major disadvantage is the necessity to maintain a high vacuum which require special parts and special maintenance. The result of the exotic equipment is the relatively high cost of mass spectrometer testing. In contrast, the air pressure decay test is inexpensive and well suited for automotive industry conditions. However, the test is neither fast enough nor accurate enough for the automotive industry. The test is conducted by either pressurizing or evacuating the fuel tank to be tested. Either the rate of pressure differential is measured or the rate of flow necessary to maintain a constant pressure is measured. The speed of this test is greatly affected by the part size and by the test pressure, and the accuracy is affected by the temperature of the part tested.

A rather comprehensive and descriptive work on leak detection methods has been prepared by Varian Associates Incorporated and is entitled "Introduction to Helium Mass Spectrometer Leak Detection", published in 1980.

Halogen leak detectors are commonly used, particularly in the refrigeration industry, and typically involve system pressurized with a test gas containing an inorganic halide or similar gases. The exterior of the system is then scanned with a sniffer probe sensitive to traces of the test gas. Disadvantages of the system are that such leak detectors will respond to a variety of other gases, including cigar smoke, and that most systems release the test gas into the atmosphere.

A particular problem found in leak detection systems that utilize a test gas is the discharge of the test gas into the atmosphere both outside the plant and inside the plant. The EPA has established allowable exhaust concentrations for dichlorodiflouromethane (R-12) of 1000 parts per million. Although R-12 is not toxic, it may cause oxygen deficiency at concentrations of approximately 28.5 percent by volume or 89.6 pounds per thousand cubic feet of air. These concentrations may appear at first to be quite high and improbable, but consistent and continuous exposure to significant concentrations of halogens may cause an affect upon the operator of the test. It is therefore a particular object of the invention to reduce the chances of such an occurrence.

The objective of this invention is to provide a rapid yet accurate method of detecting leaks in fuel tanks suitable for use in the automotive industry. Systematic testing of fuel tanks during production serves two purposes, it ensures the proper functioning of the production system and it ensures quality control by eliminating tanks that would leak in use. The system must be rugged enough to withstand the automotive factory floor conditions, particularly the rapid loading and unloading required for production line speed, and yet be sensitive enough to detect small leaks in a fuel tank. Most leaks in fuel tanks occur around the welding seam of the tank, as most fuel tanks are of a two-piece metal construction. Recently, however, seamless plastic fuel tanks have been growing in popularity with the automotive industry. Small, but significant leaks may occur in plastic tanks at any portion of the tank. In spite of the automotive industry's desire for accuracy in leak detection, the overriding consideration has always been the speed with which a test may be run. Each second may be critical in the efficiency operation of an automotive plant, making automation of the system a necessity.

Perhaps the most important requirement of a leak detecting system in the automotive industry is its ability to be reused time and time again as the test is repeated with the numerous individual parts to be tested. A detection system must retain its sensitivity and consistently produce accurate results. The present invention particularly avoids many problems which could arise from such repeated use.

In selecting a leak detection system that utilizes a vacuum, there are again competing interests. The smaller the chamber to be evacuated, the more quickly and efficiently the system can be run. Servicing may be a crucial factor in the selection of leak detecting system, as any downtime caused by a wait for a needed part can be very costly in today's automotive industry. Another problem faced in leak detection systems is the variation in a group of parts to be tested. Although the parts may have been simultaneously or consecutively manufactured, the products may not be identical and may have small variations in their dimensions or configurations. Accordingly, a leak detection system must be able to be adapted to the individual part being tested.

Another problem that must be confronted in utilizing vacuum leak detection systems is the effect of the resulting pressure differential upon the fuel tank being tested. Conventional fuel tanks are made of a two-piece metal construction welded at the flange of each half. Since leaks often occur in fuel tanks at the weld at the flange, one method previously used in the art utilizes a flexible chamber that will collapse around the tank being tested at its weaker points. Thus, the flange of the tank is unsupported through the test, but the weaker basins of the tank halves are supported by the vacuum chamber itself.

Although flexible chambers are useful in reducing the volume in the chamber needed to be evacuated, the use of a flexible chambers reduces the effectiveness of other methods which improve the speed and accuracy of the test. Additionally, flexible chambers will tend to block or cover leaks and therefore reduce the effectiveness of the test except at the area surrounding the flange. As previously noted, this is not as great of a concern when conventional metal tanks are tested as the majority of leaks occur at the seams; seamless plastic fuel tanks, however, are likely to leak at any given point on the tank. Even with conventional metal tanks, uniform leak detection is an objective.

Furthermore, a flexible chamber does not provide a tank with structural support from the atmospheric pressure without the chamber. Should a vacuum be drawn within the tank to equalize the pressure within the tank and within the chamber, as may be done in scavenging the tank, a flexible chamber would allow the external air pressure to act upon the tank. As fuel tanks have much greater tensile strength than compressive strength, it is important that if even a slight vacuum occur within the tank that the chamber be sufficiently rigid to withstand atmospheric pressure. Moreover, flexible chambers cause very great difficulty in supporting the peripheral seals and very great difficulty in effecting chamber modifications due to difficulty in effective gluing of elastic material.

A common method of supporting parts to be tested by vacuum chamber leak detection methods is to provide the test chamber with ribs, so that the part will be suspended between ribs when the chamber is closed. In this manner, a substantial portion of the surface of the part tested is exposed to the vacuum created within the chamber. A particular problem with such devices, however, is that the portions of the surface of the part tested that are contacted by the ribs are not exposed to the vacuum. Any leaks occurring in such portions not exposed to the vacuum would not be detected in the test as the ribs would effectively be "plugging" the leak. It is an objective of the invention to provide support for the part tested while completely exposing the entire surface of the part tested to the vacuum in a vacuum leak detection system.

Detecting the presence of a leak is important to ensure that no container with a leak is released to the public, but unless the leak is detected, the container cannot easily be repaired nor may the cause of the leak cannot be determined. Therefore, it is a distinct advantage for a leak detection method or apparatus to provide a means for locating any leak detected. Knowledge of where the leak in a container is located could aid in identifying deficiencies in the material used in making the container, in the method of forming the container and in any method of sealing the container, such as welding. Additionally, locating any leak indicated by a leak detection system would expose any deficiencies in the leak detection system itself and prevent the waste of a good container which may have been rejected merely because of a leak in the detection system. It is an objective of the invention to locate leaks in addition to detecting leaks.

Other objects, features and advantages of the present invention will become apparent from the susequent description and the appended claims taken in conjunction with the accompanying drawings.

PRIOR ART

An example of the prior art in the field of leak detecting by use of vacuum chamber is illustrated by Pendleton, U.S. Pat. No. 3,813,923, "Adaptive Fixture For Leak Testing of Containers". Pendleton discloses the use of a chamber which contains a flexible diaphragm. The diaphragm is forced toward the container tested to engage and support the container by increasing the pressure in the space between the diaphragm and the chamber. The diaphragm is also provided with protrusions which allow the diaphragm to contact the container tested while maintaining a fluid space between the diaphragm and the container tested. Pendleton discloses the use of a vacuum to evacuate this fluid space and the use of a halogen test gas with a halogen gas sensor.

The use of a vacuum chamber, in particular a flexible chamber, to facilitate an inside-out test fuel leak detection test is known in the art, as is illustrated by Pendleton. The present invention is distinguishable over the prior art in the speed, reliability and accuracy with which the test may be run. The vacuum chamber in the present invention is designed such that a new chamber may be formed for each series of parts that are to be tested. Moreover, the prior art does not suggest a scavanging process, porous or grooved standoffs, self-aligning seals, or a leak locating method.

BRIEF DESCRIPTION OF THE DRAWINGS

FIG. 12 is a schematic drawing of the operation of an apparatus for locating a leak upon detection of a leak.

FIG. 13 is a schematic drawing of the operation of an apparatus for locating a leak upon detection of a leak.

SUMMARY OF THE INVENTION

Figure 1:
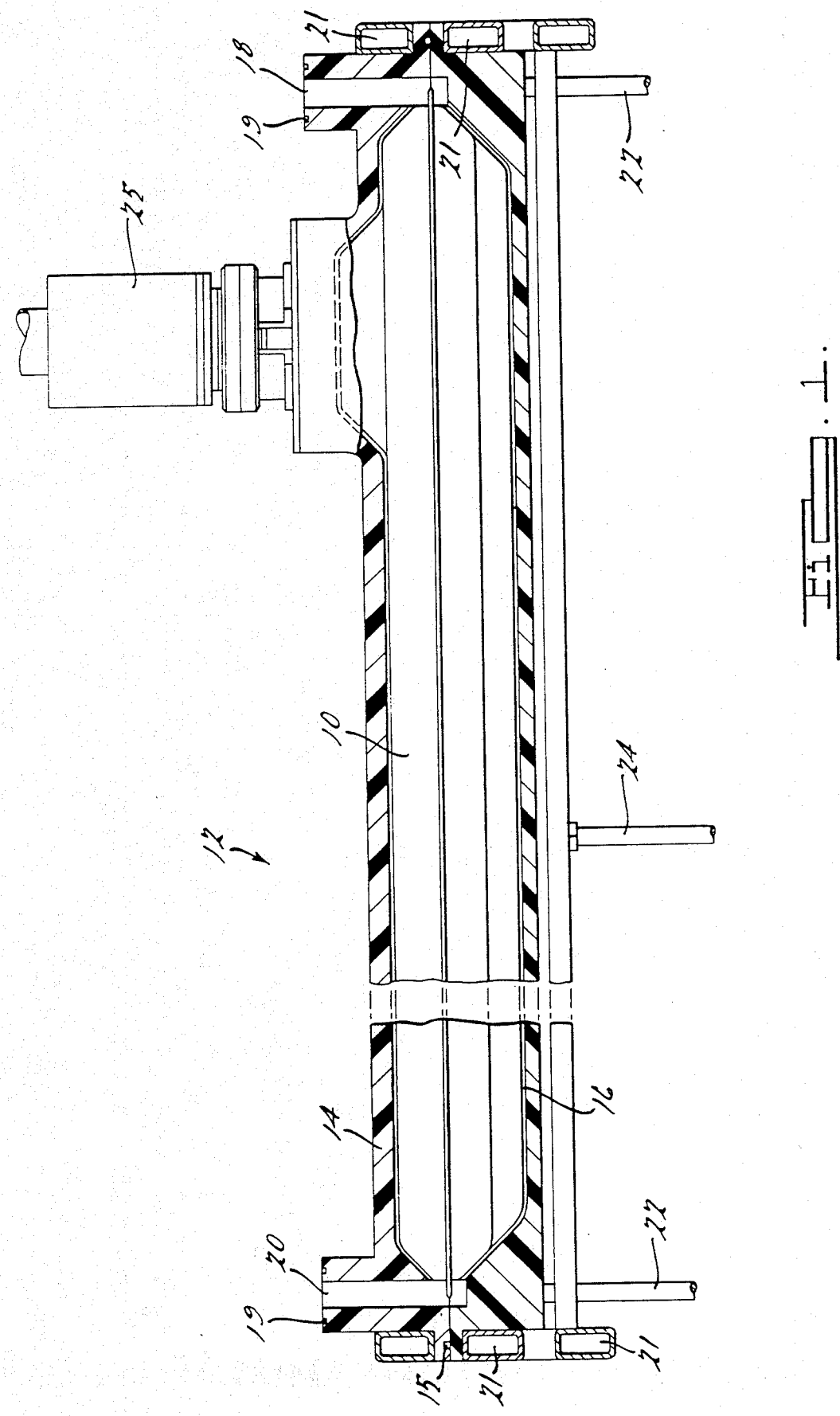
FIG. 1 is al longitudinal cross section of an apparatus for detecting leaks in fuel tanks.

The fuel tank leak detection method and apparatus described herein is an "inside-out" detection system. The method is initiated by loading a fuel tank into a two-piece test chamber formed for the fuel tank to be tested. The chamber is closed and sealed. Each of the ports of the fuel tank tested is sealed. The chamber is partially evacuated and the fuel tank is pressurized with a test fluid. The pressure differential will cause the test fluid to flow into the test chamber through any leak existing in the fuel tank. The output of the vacuum pump which is used to maintain the reduced pressure in the test chamber during the test is directed through a sensor which would detect the existence of any of the test gas that entered the test chamber.

The method particularly described herein enables this procedure to be conducted at factory speeds under factory conditions while maintaining a high degree of accuracy. The accuracy and sensitivity of the leak detection system is improved by eliminating virtually all of the external sources of the test gas and by removing all residual test gas in the sytem before conducting each test. All air entering the system is filtered so that no traces of the test gas existing in the atmosphere may enter the system. All air exiting the system may be filtered or exhausted to the outside so that traces of the test gas will not enter the atmosphere in the test area. This filtration of the effluent air increases the accuracy of the test and increases the safety of the test by reducing the chance of anyone in the area of test being affected by the test gas. Effluent filtration additionally serves to prevent emission of the test gas into the environment and allows the test gas to be collected for possible recycling.

The speed of the process, the most critical factor, is enhanced by the particular pumping system utilized, which also enhances the sensitivity of the process. A rough pump is utilized to quickly evacuate the test chamber to the desired pressure at which point a smaller pump is utilized to maintain that pressure throughout the test. This system derives the speed of a large capacity pump while maintaining the accuracy of a small pump and avoids the problems inherent in each.

The apparatus described herein provides a means for conducting an "inside-out" leak detection system that is particularly suited for the automotive industry. Operation of the device consists of loading the fuel tank into a test chamber, sealing the test chamber, sealing the fuel tank, evacuating the test chamber, filling the test chamber with scavenge air, evacuating the test chamber, pressurizing the fuel tank with a test fluid, switching system to the test pump, sensing any test fluid flowing into the test chamber, scavenging both the fuel tank, and test chamber and removing the fuel tank tested. The entire system or portions thereof may be automated. The configuration of the apparatus reduces the time required to conduct the test by reducing the volume of the test chamber to be evacuated. The test chamber described can be rapidly and inexpensively formed so that it may easily be replaced in instances of damage to the test chamber or a change in design of the fuel tank to be tested requiring a different test chamber. A test chamber can be easily modified in case of minor design change to the profile of the tank tested. The configuration of the test chamber is such that the stresses resulting from the pressure differential during testing are carried by the test chamber rather than the fuel tank tested.

The apparatus provides means for sealing the ports of the fuel tank to be tested that are easily automated and can adapt to variances between individual fuel tanks tested. These sealing means can also be utilized to provide inlets of the test gas and for scavenging air to enter the fuel tank tested. Additionally the sealing means can provide an outlet of all air exiting the fuel tank tested.

An additional embodiment of the apparatus provides a method of supporting a part to be tested with porous standoffs such that the entire surface of the part to be tested is exposed to the vacuum during testing.

Another embodiment of the apparatus enables the location of the leak to be identified by sequentially flushing and sensing each of a plurality of leak zones.

The drawings show merely exemplary embodiments of the preferred invention for purposes of illustration only. One skilled in the art will readily recognize that the principles of the invention are well adapted for application to devices other than fuel tank leak detectors, as well as to fuel leak detectors other than those shown in the drawings.

DESCRIPTION OF THE PREFERRED EMBODIMENT

The test is conducted by loading the fuel tank into the lower portion of the vacuum chamber. The chamber is closed and sealed. A vacuum is then drawn into the chamber through the vacuum port. If any large loss of pressure inside the tank is detected the test is stopped and the tank is rejected as there is a large leak in the tank. A large rough vacuum pump is used to quickly draw the vacuum. When the rough pump has achieved the desired vacuum, the system is switched over to a smaller sensing pump for the testing. The switching operation between pumps is conducted by having the small sensing pump pull a vacuum in a line running through a valve to the vacuum chamber. When the pressure inside the vacuum chamber reaches the same vacuum as the sensing pump, a pressure switch activates the valve opening the line to the vacuum chamber and closes the line from the rough vacuum pump to the vacuum chamber. Since the rough pump is utilized to speed up the testing process by pulling the chamber down to the desired vacuum pressure rapidly, leakage is not a major concern in the rough pump. The sensing pump however must not leak in operation. A diaphragm pump is the preferred choice for the sensing pump. Oil filled pumps cannot be used for sensing, as R-12 is soluble in oil. An air flow meter may be inserted at the diaphragm pump outlet to determine if there is a leak in the diaphragm pump which would indicate that the pump was bad; an air flow meter will also show leakage in the chamber, tank seals or in the associated valves and lines.

A hologen or similar test gas is injected into the fuel tank at approximately 60–80 psi; this high pressure injection fills the tank in less than one second and causes good dispersal of the test gas throughout the fuel tank. R-12 is the preferred choice of gases primarily because of its availability. A sensor is placed at the outlet of the diaphragm pump which will detect any trances of test gas which would then indicate a leak. A systematic scavenging process is conducted before and after each test. Before the test, the chamber is scavenged to remove any residual test gas that could cause incorrect readings. After the test, the fuel tank is flushed with scavenge air to remove all the test gas from the system. The chamber is scavenged or flushed with air after each test.

The sensor is only exposed to filtered air except for when it is in use testing the tank; this will extend the life of the sensor and increase it reliability. As soon as any leak is detected, filtered air is run through the sensor. The sensor may also be automatically calibrated after a given number of tests by having the sensor exposed to a low halogen gas mixture while the next tank is being loaded and having a servo motor adjust the sensitivity by adjusting the sensor to read at a given value. Solid state devices are not preferred at this time as the memory of the calibration system must be maintained if power is lost.

FIG. 1 illustrates a fuel tank leak detecting apparatus with a fuel tank in the test chamber. The fuel tank 10 is shown in the vacuum chamber shown generally at 12. The vacuum chamber has two portions, an upper chamber 14 which is stationary and a lower chamber 16 which is lowerd to load or unload the fuel tank from the vacuum chamber and is raised to close the chamber for testing. Each of the chamber portions is concave with respect to the other, and, when closed, the chamber portions form a vacuum chamber substantially conforming to the fuel tank to be tested. A sealing element 15 (preferably an extruded rubber "T" gasket) is located near the perimeter of the two chamber portions which seals the vacuum chamber formed when the two chamber portions are brought together. The lower chamber is raised and lowered by a closure cylinder or pair of closure cylinders shown at 24 and is mounted on guide rods 22. Principal inlets into the chamber are a vacuum manifold 20 and an air manifold 18. The location and use of these inlets depends upon the fuel tank being tested and are molded directly into the vacuum chamber when the vacuum changer is manufactured. The vacuum manifold 20 connects the vacuum means to the vacuum chamber. An air manifold 18 may be used to provide an inlet for air into the vacuum chamber. The vacuum manifold an the air manifold may easily be connected to the vacuum or air inlet through the use of connecting flanges known in the vacuum industry and sealed by an O-ring 19. A primary port seal assembly, shown in perspective view at 25, provides access to the fuel tank being tested.

Figure 2:
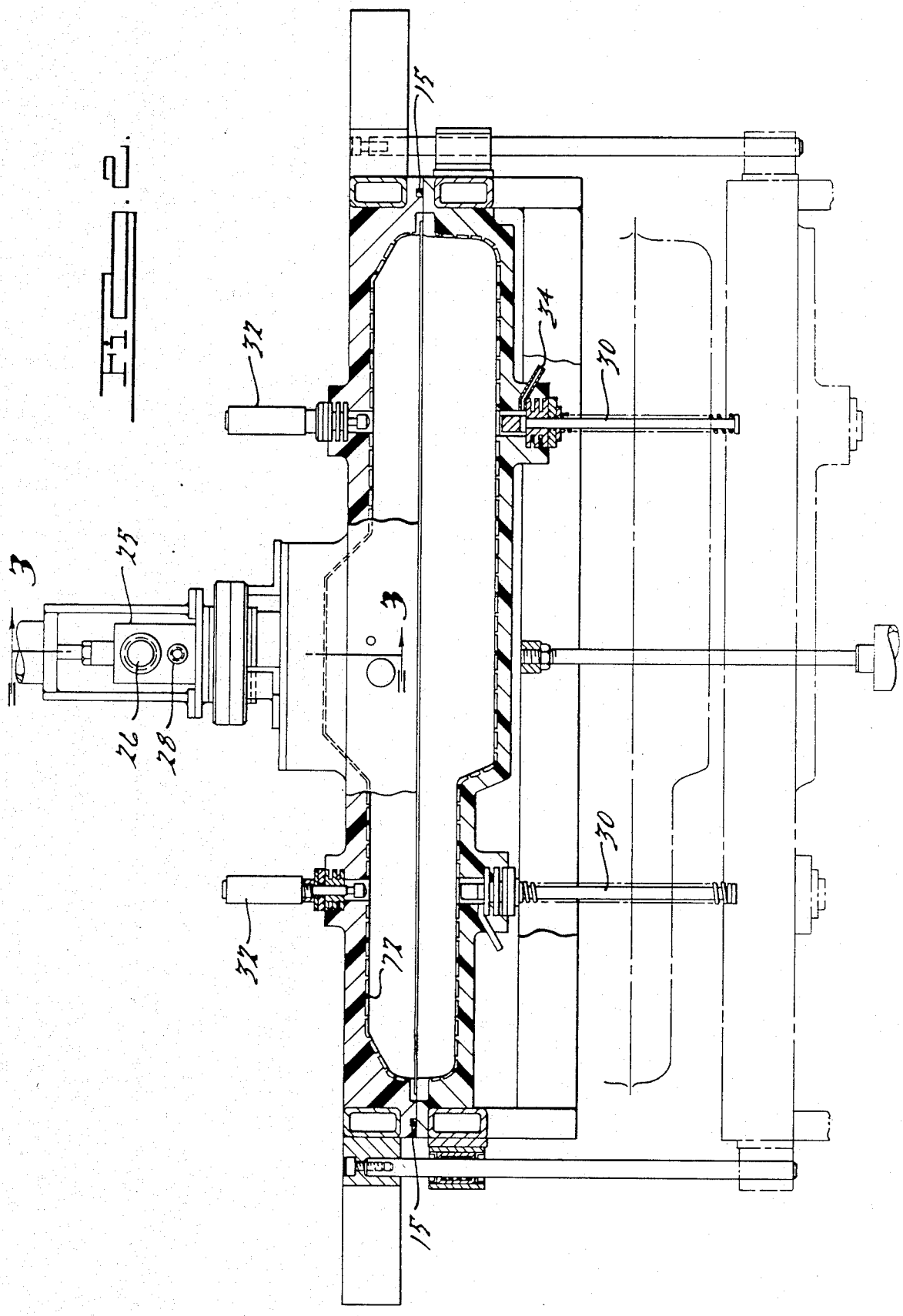
FIG. 2 is a latitudinal cross sectional view of an apparatus for detecting leaks in fuel tanks showing a perspective view of the port seal assembly.

The preferred method of construction of the vacuum chamber is inexpensive and may be so rapidly conducted that it is advantageous to construct a new chamber for each type of fuel tank to be tested or to construct a new portion of the fuel tank chamber to replace any damaged portion of the chamber. The vacuum chamber is constructed by using the particular fuel tank or type of fuel tank to be tested as a case for the chamber. As each chamber portion conforms to one half of the fuel tank to be tested, a mold for the chamber portion is formed by using a flat surface at the seam of the fuel tank and by providing dams circumferentially around the fuel tank. Other means of supporting the tank are described herein. A suitable material such as a two-part rigid epoxy is poured over top of the fuel tank and into the mold defined by the dams. The epoxy may be reinforce with chopped fiberglass (approximately 12% by weight). Two chambers may be formed simultaneously by having a flat insert at the flange of the fuel tank and pouring a suitable material over the entire tank, and dividing the mold into two at the flange. Structural supports, illustrated as 21 in FIGS. 1 and 2, are inserted during the molding process by the chamber construction with structural support and may be steel beams or the like. A steel ladder-type frame is preferred to provide the necessary support for the chamber, even though the epoxy may be fiberglass supported, to prevent the epoxy chamber from deforming over an extended period of time. Such a frame also provides strong yet convenient attachment points. The manifolds 18 and 20 are inserted onto the tank prior to the molding procedure and are integrally molded therein. Additionally the primary port seal assembly, 25, may be integrally molded into the casting.

Ribs or other supports may be formed into the chamber, shown in FIG. 2 and 72, to provide support for the fuel tank to be tested during the test. During testing, the tank is subjected to a 14.5 psi force as a vacuum is drawn in the chamber. Additionally, the interior of the tank is subjected to a 0.25–1.0 psi pressure as the tank is pressurized with the test gas. Pressure differential will force the test gas through any leak appearing in the tank, but also subjects the fuel tank to be tested to that differential pressure. The standoffs tend to protect the fuel tank from the pressure differential while maintaining a space between the tank and the chamber.

When forming the vacuum chamber, an annular element is placed around the flange of the fuel tank to provide a space for insertion of the sealing element. This sealing element 15 is used to seal the vacuum chamber portions when closed and may be replaced as often as necessary. This construction gives an essentially unlimited life to the vacuum chamber. The manifolds are similarly provided with space suitable for sealing with an O-ring so that chambers may be easily interchangeable.

FIG. 2 illustrates a general embodiment the invention with a molded vacuum chamber. A large port seal assembly 25 is shown in perspective view and contains the exhaust outlet 26. The vacuum chamber 12 is shown in the closed position, sealed by element 15. Also shown are stripper rods 30 which may be used to facilitate tank removal upon completion of the tests by raising the tank above the lower portion of the vacuum chamber when the lower chamber is lowered from the stationary upper portion. The stripper rods are positively mechanically activated as they contact the lower frame when the lower chamber is lowered and remain stationary while the lower chamber half continues to be moved downward. The result is that the fuel tank rests upon the upper end of the stripper rod while the lower chamber is lowered. The stripper rods are spring loaded so they recede relative to the vacuum chamber as the lower chamber is raised. Knock outs illustrated at 32, may also be provided to facilitate tank removal. The knock outs may be mechanically or air cylinder operated and when activated, punch the tank away from the stationary upper chamber. Drain ports are illustrated at 34 which will automatically drain any fluid which may accumulate during testing, as often may accumulate during testing, as often tanks may not be completely dry when tested.

The embodiment depicted in FIG. 2 is for purposes of illustration only. The particular arrangement of seal assemblies depends upon the particular design of the tank used. THe port assembly illustrated in FIG. 2 is shown in detail in FIG. 3 merely to illustrate one possible embodiment of a seal assembly. The seal assemblies must be configured to seal the particular ports of a fuel tank being tested, and therefore such seal assembly is designed particularly for each port for the particular model of fuel tank being tested. Seal assemblies must provide the inlets into the fuel tank for scavenge air and for the test gas, and must provide an outlet for all air being exhausted from the fuel tank. it is preferred that each of the seal assemblies be reciprocable such that the fuel tank may be mechanically sealed upon closing the test chamber.

Figure 3:
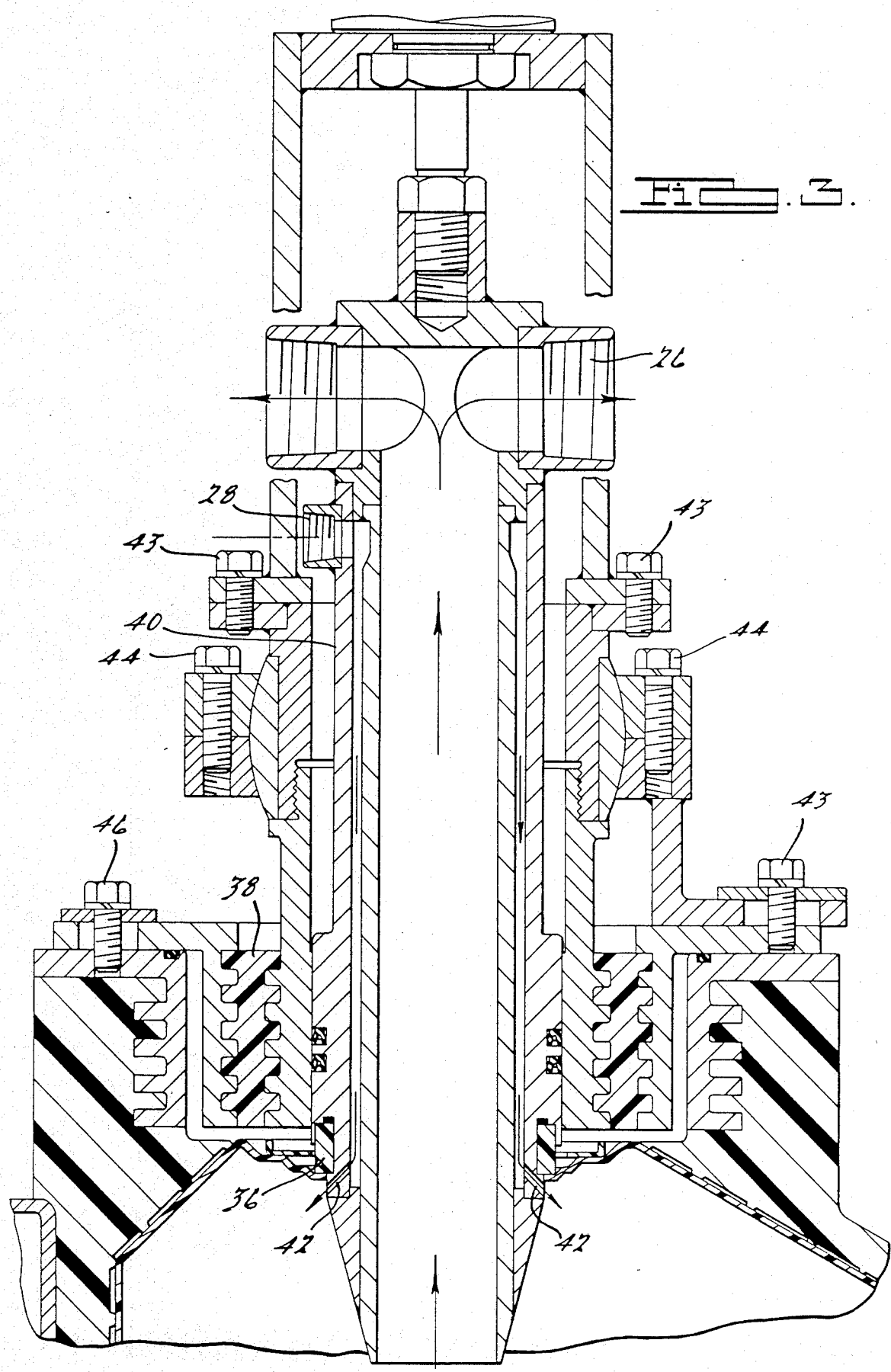
FIG. 3 is a cross sectional view of a port seal assembly taken across section 3—3 in FIG. 2.

FIG. 3 illustrates an embodiment of a port seal assembly (illustrated in FIG. 2 at 25). The seal assembly is insertable into and seals a port in the fuel tank, and is moveable to compensate for variations within a given production of fuel tank. The port shaft 40 is inserted into a port of the fuel tank and has annular urethane port seal 36 to seal the fuel tank. The vacuum chamber is sealed by a low durometer urethane diaphram 38. This diaphram is of a flexible construction so that it may withstand a five degree angular deflection of the port shaft or a 0.25 inch deflection. Inside the port shaft are the scavenge exhaust outlet 26 and the test gas inlet 28. The scavenge exhaust outlet 26 could also be an inlet, should the design of the tank require, but is illustrated herein as an exhaust outlet. In other embodiments, a vacuum could be attached to the exhaust outlet 26 to facilitate the scavenging process. The test gas or scavenge air may be injected into the fuel tank through the inlet 28 through a circumferential nozzle 42 which allows the pressurized test gas to be quickly injected into the fuel tank. The port shaft is held into place with angular adjusting clamp screws 44 and horizontal adjusting clamp screws 46.

Figure 4:
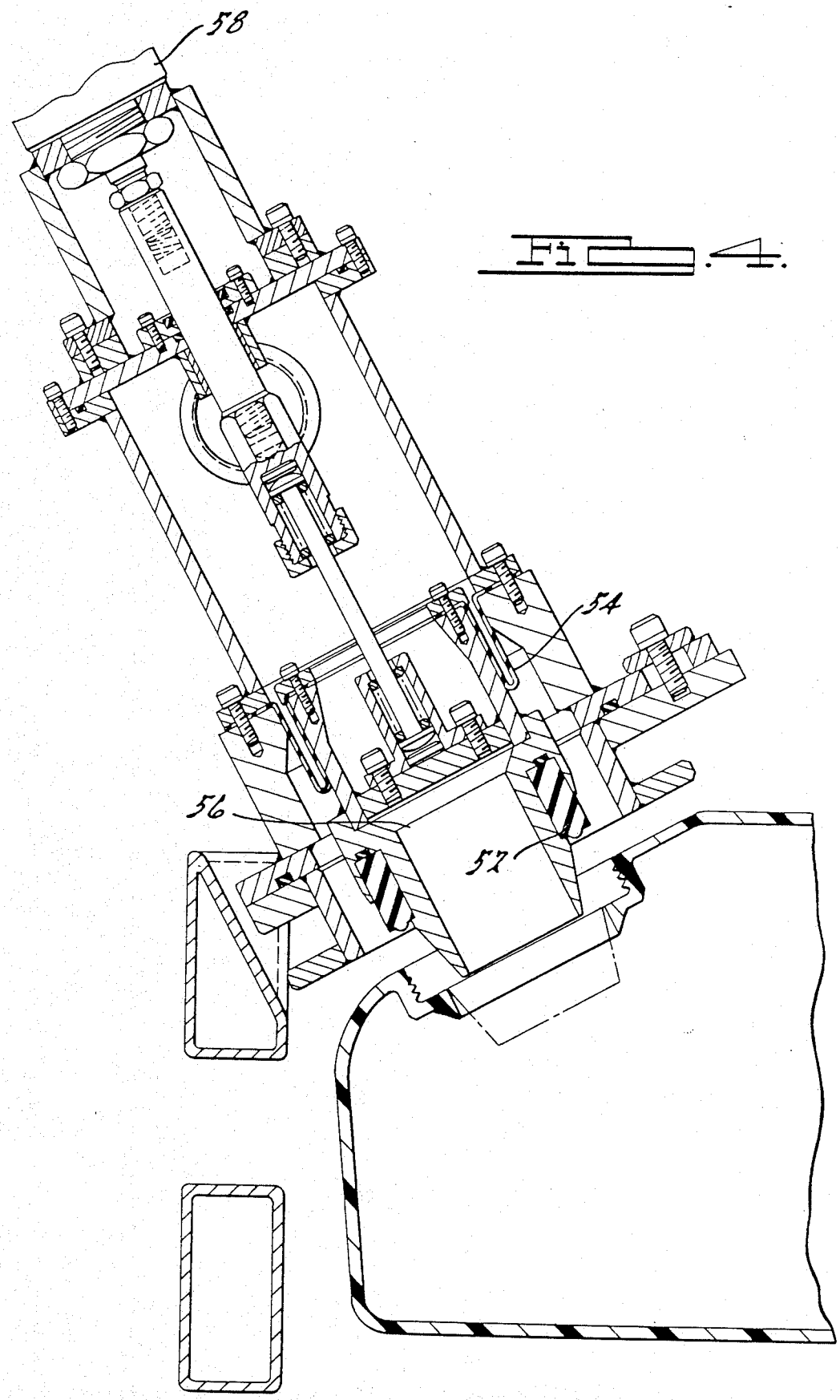
FIG. 4 is a cross sectional view of port seal assembly.

FIG. 4 illustrates an improved embodiment of a port seal assembly 50 (not inserted) which can accommodate lateral or vertical offset and angular deviation at the diametrical plane of the port of the fuel tank to be sealed. The port is sealed by the annular member 52 which is made of flexible urethane. The improvement lies in the use of the diaphram 54 which allows for vertical, lateral, or angular deflection of the shaft assembly 56. Similar to the embodiment of the shaft seal assembly in FIG. 3, the seal assembly of FIG. 4 may be used as an inlet or outlet to the fuel tank, and is reciprocable by an air cylinder 58.

Figure 5:
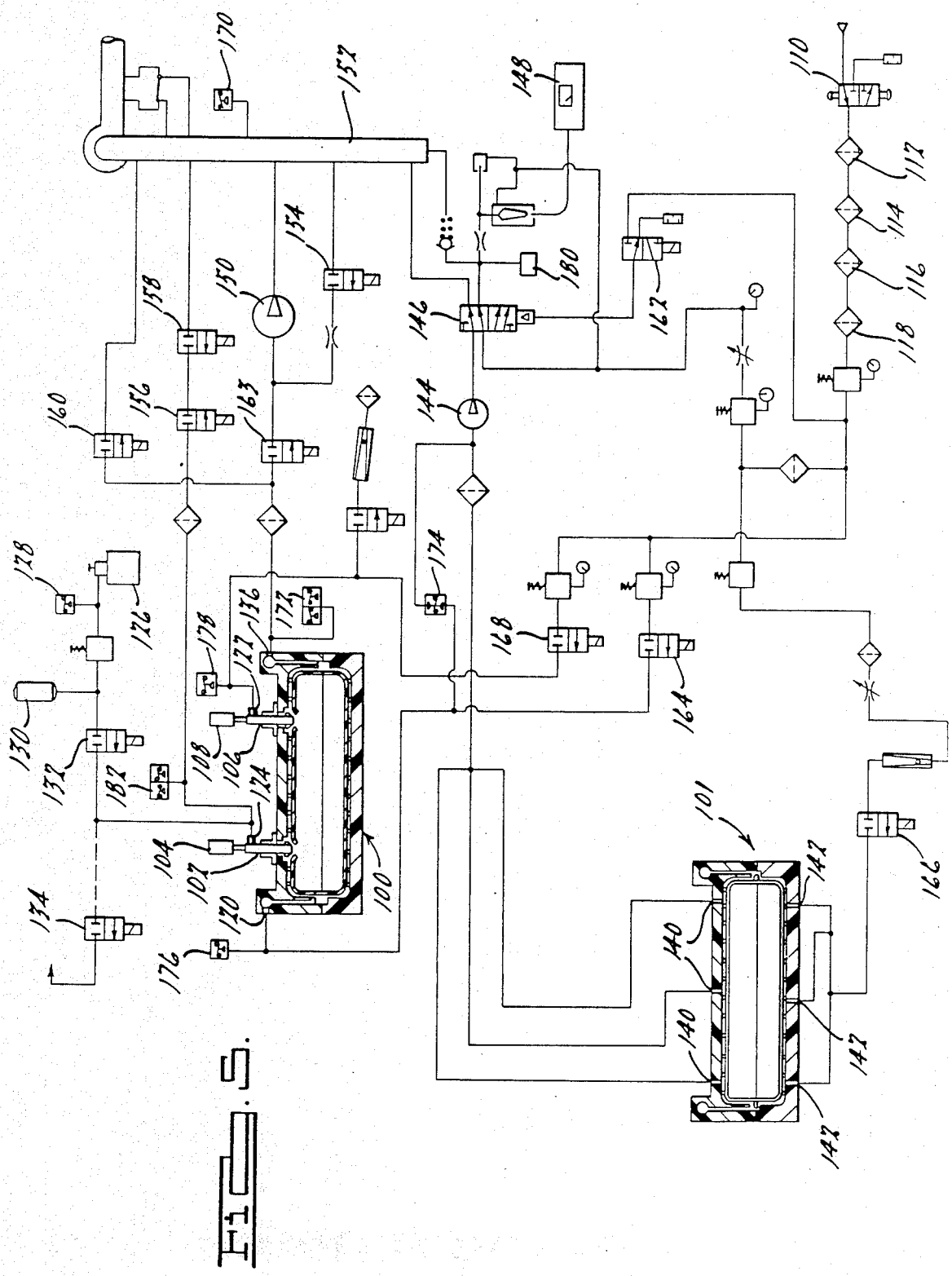
FIG. 5 is a pneumatic schematic of a system for operating an apparatus for detecting leaks in fuel tanks.

FIG. 5 illustrates a pneumatic schematic of a testing process as controlled by an automatic system. The test chamber with fuel tank in place for testing is shown at 100. The tank is placed in the test chamber, and the test chamber is closed by one or more pneumatic cylinders (not illustrated). A first port seal assembly 102 is reciprocated by a pneumatic cylinder 104 and a second port seal assembly 106 is reciprocated by pneumatic cylinder 108 to seal the fuel tank ports. Air to be utilized during the test is controlled by a valve 110 and purified through a system consisting of a particle fiber 112, a two-stage coalescer 114 and 116 and an adsorber at 118. An activated carbon filter has been found effective in removing all halogen gas particles. This filtration step preserves the sensitivity of the test by eliminating a possible source of trace amounts of the test gas. A separate air supply may be used as typical plant air supplies may not be capable of providing the necessary amount of air. Air is inlet into the chamber through the chamber inlet manifold 120 and is inlet into the tank through the port 122 in a port seal assembly 106. The test gas is stored in a supply canister 126 at approximately 60–80 psi and may be further pressured and contained in a surge tank 130, and is inlet into the fuel tank through the port 124 in a port seal assembly 102. The flow of the test gas may be controlled by a valve 132. If the test gas input requires a separate input port, a scavenged value 134 is required so that the test gas input line may be scavenged to remove all presence of the test gas. Air is exhausted from the tank through the first port seal assembly 102 and from the chamber through the chamber exhaust manifold 136. For illustrative purposes, an additional view of the tank inside the chamber appears at 101 to demonstrate the use of test outlets 140 and test inlets 142. Purified air is inlet at test inlets 142 to cause a flow towards the test outlets 140 such that any particles of test gas which escaped through the tank during the test will be exhausted through the outlets 140. Although this flow of purified air is so small that it does not appreciably effect the pressure in the chamber, the resultant flow increases the speed of the testing process such that production speed may be met. Air exiting the chamber is routed through the sensing pump 144 and the sensor inlet valve 146. During the sensing stage, the output is directed past the sensor 148. Air is pumped from the chamber through the exhaust manifold 136 by the roughing pump 150 and enters the exhaust outlet 152. So that the roughing pump 150 may be in constant operation, a pump bypass valve 154 is utilized to provide an air flow for the pump when the pump is not needed to evacuate the chamber.

Important features of the test are its degree of accuracy and its speed. No tank will be passed that has a leak. Any indication of a leak results in the rejection of the tank being tested. In addition to the detection of test gas enetering the chamber, any significant pressure drop at any stage results in the lighting of a fault lamp and the rejection of the tank tested. A given number of consecutive tank rejections results in a signal to the operator so that an inordinate number of tank rejections would not result from an equipment malfunction such as a seal leak or so that a systematic defect in the tanks may be noted and corrected.

The test is begun by loading a test vessel into the chamber and closing the chamber. While closing the chamber the tank exhaust valve 156 is open, the test gas line scavenge valve 134 is open, the chamber exhaust valve 160 is open, and the pump bypass valve 154 is open. During this stage, the exhaust vacuum detector 170 examines the exhaust pressure; if the pressure is too low, the test is aborted and the fault light is lit. Once the chamber is closed the seal assemblies are reciprocated to seal the test vessel. The tank exhaust valve 156, the test gas line scavenge valve 134, the chamber exhaust valve 160 and the pump bypass valve 154 are all open. Once the chamber is closed and the tank sealed, the chamber is evacuated and then scavenged; where the tank scavenge outlet valve 156, the chamber scavenge inlet valve 164, and the chamber scavenge outlet valve 160 are all open, and the chamber scavenge pressure detector 172 monitors the chamber pressure and aborts the test if the pressure is too high or too low. Once the chamber has been scavenged, the chamber is evacuated by closing the rough pump relief valve 154 and opening the rough pump valve 163, which allows the rough pump 150 to evacuate the chamber rapidly. The sensor inlet valve control 162 is open which controls the sensor inlet valve 146. The pump control valve 174 detects when the chamber vacuum equals the pressure in the sensing pump 144, at which point it will switch the output to the sensing pump 144. If this transition does not occur within 1.5 seconds the test is aborted and the fault light is illuminated. Means for detecting a small negative pressure in the fuel tank may be included to detect a gross leak in the tank. Once the chamber has been evacuated and the output switched to the sensing pump, the rough pump relief valve 154 is opened and the rough pump control valve 163 is closed so that the rough pump may continue operation without affecting the system. The vacuum level indicator 176 detects whether the vacuum inside the chamber is maintained at at least a given minimum level, if the vacuum level is not maintained the test is aborted. Once the chamber has been evacuated to test conditions, the tank is filled rapidly with the test gas by opening the test gas inlet valve 132. The displacement inlet valve 166 is opened to allow the small flow of purified air to facilitate the flow of the test gas to the test outlets 140. The sensor inlet control valve 162 and the high volume pump relief valve 154 and the vacuum level detector 176 are open. The test gas pressure control detector 178 closes the test gas inlet valve 132 when the pressure within the tank reaches approximately 1.0 psig. If such pressure is not reached within one second, the test is aborted to scavenge and the fault light is lit. During sensing the displacement inlet valve 166, the sensor inlet control valve 162 and the rough pump relief valve 154 all remain open. Similarly, the vacuum level detector 176 is in operation. The sensing pump output flow detector 180 will abort the test if the detector sees a flow greater than the normal operating flow, which would be indicative of a leak to atmosphere. The test gas sensor 148 is engaged and will abort the test upon the detection of any test gas. Upon completion of the test or upon any detection of test gas, or upon any detection of a leak which causes the abortion of the test, the system goes into a scavenge mode wherein the tank and the chamber are scavenged so that all particles of test gas are removed. The tank scavenge inlet valve 168, the tank scavenge outlet valves 156 and 158, the test gas line scavenge valve 134, the rough pump relief valve 154, the chamber scavenge inlet valve 164, and the chamber scavenge outlet valve 160 and all open. The tank scavenge pressure detector 182 and the chamber scavenge pressure detector 172 each detect whether the pressures are too high or too low and will abort the test upon either. Upon opening the chamber after the test the tank exhaust valves 156 and 158, the test gas line scavenge valve 134, and the chamber exhaust valve 160 are all open. The test gas low pressure detector 128 and the exhaust vacuum pressure detector 170 will indicate whether the pressures are too low upon which time it will stop the test and light the fault light.

Due to emission standards and the health concerns of the workers of the plant, the entire system in use is closed to the plant atmosphere. The EPA permit a concentration of 1000 parts per million of R-12 to be exhausted into the air. All exhaust air may be filtered in a high efficiency multi-stage filtration process before being released into the atmosphere. While the scavenging procedure improves the reliability of the test, it also reduces the amount of R-12 released in the atmosphere of the plant by removing most of the R-12 from the tanks test and the vacuum chamber before the chamber is opened. Automatic drains may be provided to remove any water from the vacuum chamber as tanks may be wet when tested. The drains may be opened during the scavenging process.

Rupture disks may be inserted in the tank and chamber outlet lines prior to the outlet valves to release pressure should a vacuum build up to too great a pressure. Since the invention claimed does not operate as nearly a high a vacuum as the helium mass spectrometer process, for example, danger of the high pressure vacuum is not as great. However, considering the speed with which the process may be operated, a build up of pressure may be rapid and if unchecked could cause a rupture of the chamber.

Figure 6:
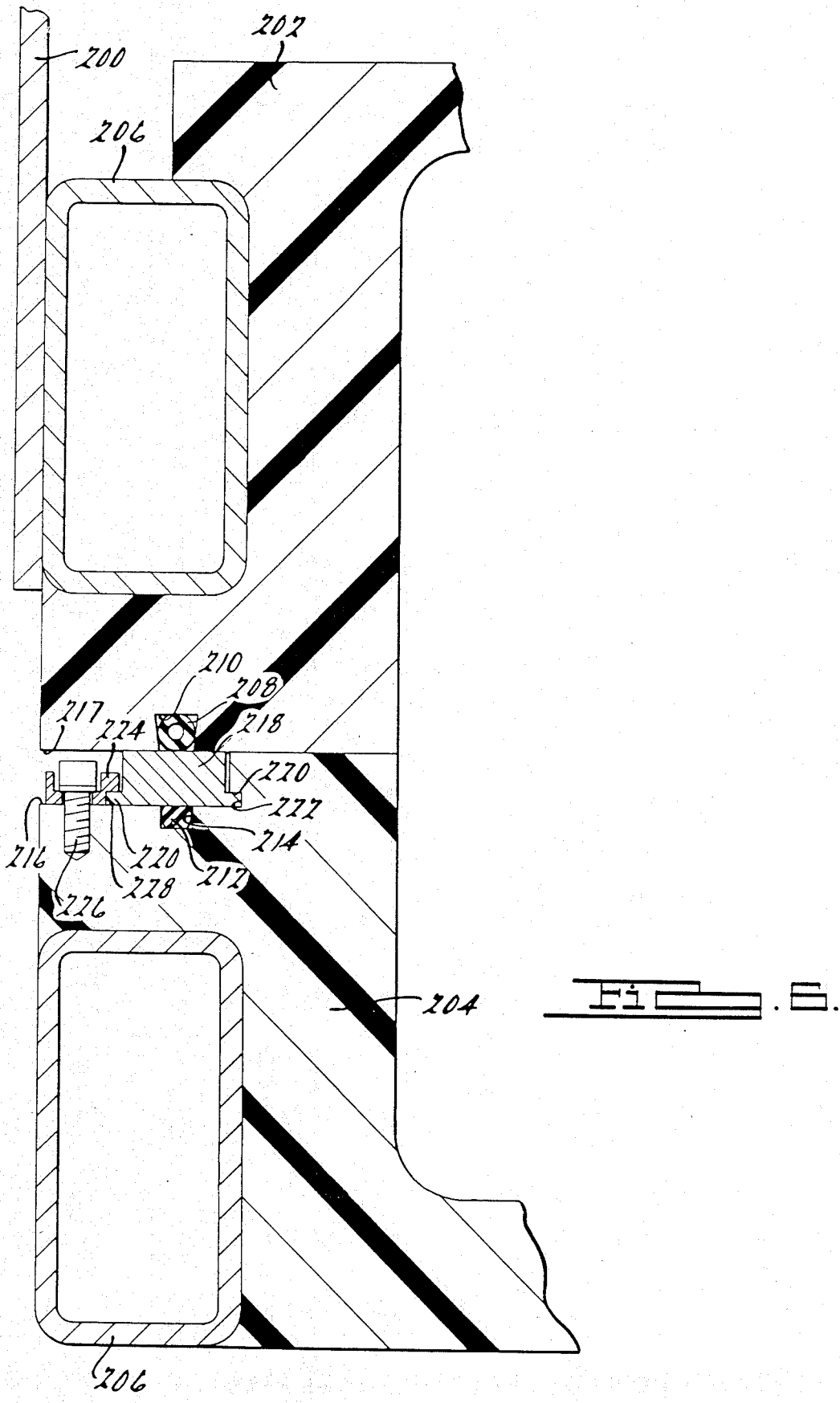
FIG. 6 is a cross-sectional view of an apparatus for detecting leaks in fuel tanks illustrating the sealing arrangement.

FIG. 6 illustrates the sealing arrangement of the upper and lower portions of the test chamber. The chamber 200, consists of the upper chamber portion 202 and the lower chamber portion 204 and is structurally supported by steel beams 206. The chamber is sealed through the use of three anular sealing rings. An O-ring 208 is insertable into a trapezoidal notch 210 which is formed in the upper portion 202 upon pouring the upper portion. Another O-ring 212 is insertable into a groove 214 formed in the lower portion 204 upon pouring the lower portion. The sealing face 216 of the lower portion is offset from the sealing face 217 of the upper portion. An annular T-shaped sealing ring 218 is insertable between the two sealing faces 216 and 217, and is of a normal noncompressed height greater than the offset distance between the two sealing faces. The T-shaped sealing ring 218 is located between the O-ring 208 and the O-ring 212 such that a sealing arrangement exists between the upper portion 202 and the O-ring 208, the O-ring 208 an the T-shaped sealing ring 218, the T-shaped sealing ring 218 and the O-ring 212, and between the the O-ring 212 and the lower portion 204. The sealing ring 218 is compressible to the offset distance between the upper and lower chambers when the chamber is closed. This creates a further sealing arrangement between the upper portion 202 and the sealing ring 218 and the sealing ring 218 and the lower portion 204. The sealing ring 218 has flange shaped portions 220 so that it is secured to the lower chamber. A retaining strip 224 may be secured to the lower chamber by means of screw means 226 to retain the sealing strip 218. Preferably, however, grooves 222 and 228 are formed in the lower chamber upon pouring the lower chamber such that the sealing ring 218 is insertable into the grooves 222 and 228 and retained therein by fictional means. This method of securing the sealing ring 218 reduces the costs and time of assembly of the chamber and of replacing the sealing ring 218.

Figure 7:
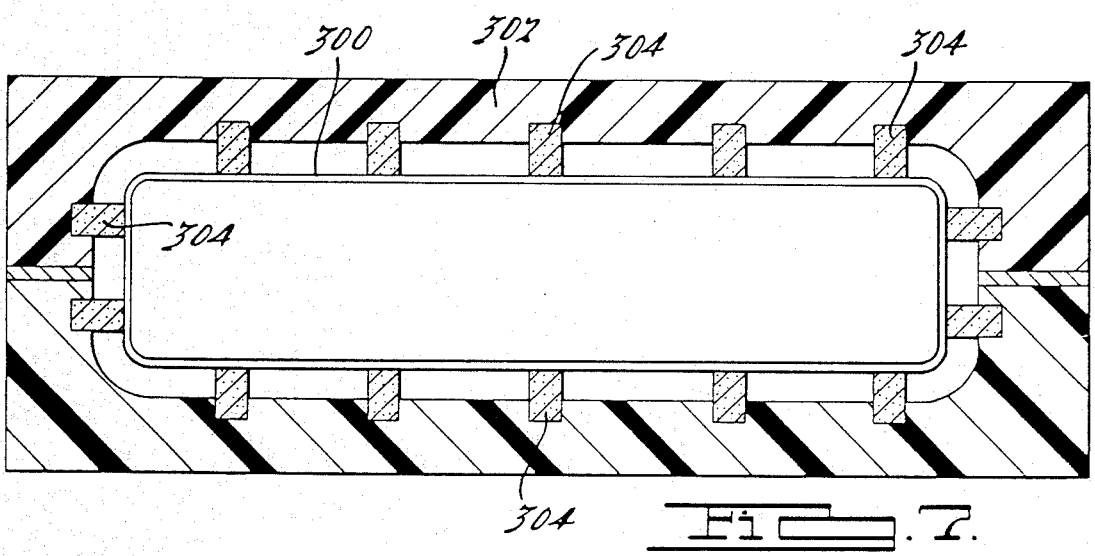
FIG. 7 is a cross-section of a test part supported in a test chamber with porous standoffs.

FIG. 7 (not to scale) illustrates a part 300 being tested in a vacuum chamber 302 of a leak detection device, supported by porous standoffs 304. The porous standoffs 304 are configured to allow the passage of gases through the standoffs. The type of standoff illustrated in FIG. 7 is a flat face boss of a circular configuration which has been cast into the chamber. Other methods of attaching standoffs such as gluing with cyandacralate adhesive may be used. The standoffs need not be circular and may be of any configuration, but cylindrical standoffs having a $\frac{3}{8}$ inch diameter and 0.09 inch height are preferred. Rather than being of a uniform cross sectional area, the standoffs may be cast with a substantially larger area within the face of the chamber and a smaller area exposed from the surface of the chamber. The protruding portion of the standoff must have a sufficient compressive strength to support the part being tested while a vacuum is drawn within the chamber. Similarly, there must be sufficient number of standoffs to evenly support the part tested while a vacuum is drawn within the chamber, a spacing of approximately $1\frac{1}{4}$ inches in each direction is preferred. As long as the part is adequately supported, the smallest volume of standoffs between the chamber and the part is preferred. Reduction of the volume of standoff protruding from the chamber surface reduces the amount of gas flow through the standoffs. Although it is not required that the standoff have a greater cross-sectional area within the chamber, such a configuration adds stability and increases the force anchoring the standoff within the chamber. A particular configuration which reduces the volume of standoff between the chamber and the part supported is essentially the flat face boss configuration described above in which two perpendicular grooves or slots have been cut. There could be any number of grooves cut, which could be of any depth, shape, direction or width to reduce the volume of the standoff as long as the part is adequately supported. Another viable configuration is to provide porous ribs which may be cast within the chamber and may be of any width, length or spacing within the limits of adequate part support.

Porous standoffs or ribs may be constructed of any suitable porous material which has sufficient compressive strength to support a part while a vacuum is drawn within the chamber, steel screens have proven particularly effective. Urethane (of about 70-A durometer) is used to avoid scratching the special coating on some fuel tanks. Porous metal standoffs may be used of the same size and spacing on most metal tanks or plastic tanks. The standoffs may be partially or wholly hollow to reduce cost or to reduce possible gas entrapment. Additionally, the standoffs need not be wholly composed of porous material, as long as there is a sufficient path of porous material contacting the part supported so that any leaks are not plugged and so that gas may flow through the standoff.

The force per standoff is calculated by subtracting the chamber absolute pressure (force per unit area, such as pounds per square inch, absolute) from the fuel tank internal absolute pressure. The resultant is multiplied by the average unit area (such as square inches) per standoff. The standoffs typically are uniformly spaced.

Figure 8:
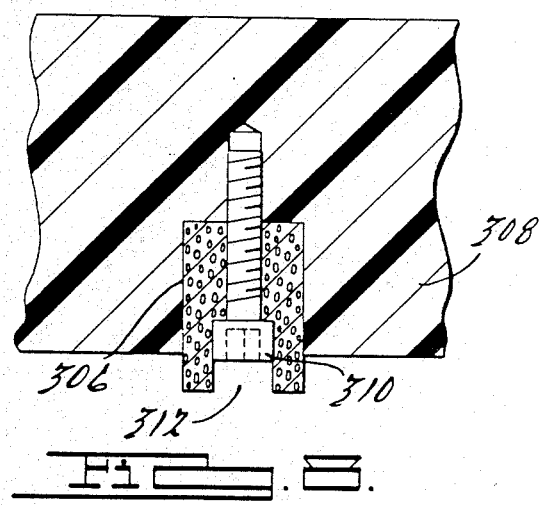
FIGS. 8-11 are cross-sections of porous standoffs secured to a test chamber, illustrating various methods of securing the porous standoffs to the test chambers.

FIGS. 8–11 illustrate methods of securing porous standoffs to the chamber surface. In FIG. 8, the standoff 306 is configured to be insertable into a corresponding cavity in the chamber 308. The standoff is secured to the chamber by a screw 310, which is positioned toward the center of standoff in a cylindrical bore 312. Only the remaining circumferential portion 314 of the standoff protrudes from the chamber, which reduces the volume of porous material protruding.

Figure 9:
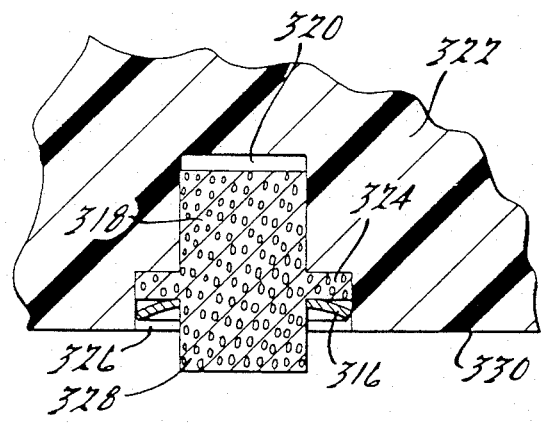

FIG. 9 illustrates the use of a circular, tooth push-on retaining ring, 316. The standoff 318 is insertable into the cavity 320 of the chamber 322. The cavity 320 has a smaller internal diameter and a large external diameter. The standoff 318, is similarly configured with a smaller diameter and a larger diameter. The smaller diameter of the standoff 318 substantially fills the smaller diameter of the cavity 320. The larger diameter of the standoff 318 is substantially the same as the larger diameter of the cavity 320 such that the standoff 318 is slidably insertable into the cavity 320. The thickness of the larger diameter of the standoff 318 is less than the thickness of the larger diameter of the cavity 320, forming a flange 324 and leaving a recess 326 in the cavity 318. A boss 328 protrudes beyond the chamber surface 330, and is of a diameter less than the larger diameter of the standoff 318. The retaining ring 316 is inserted over the boss 328 and into the recess 326. The retaining ring 316 is concave such that it will flex inwardly reducing its diameter while being inserted but will tend to expand its diameter if stressed outwardly. The retaining ring 316 may have teeth on its perimeter to aid in the frictional engagement with the interior walls of the recess 326.

Figure 10:
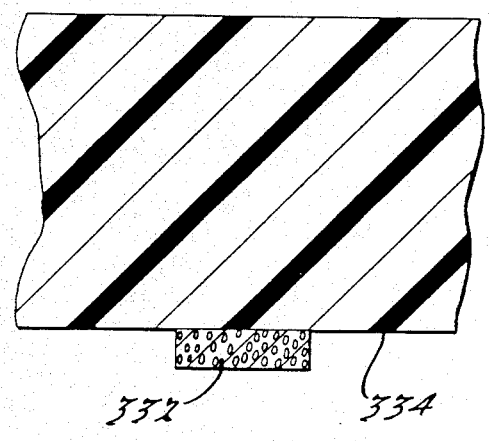

FIG. 10 illustrates the use of an adhesive to secure the standoff 332 to the surface of the chamber 334.

Figure 11:
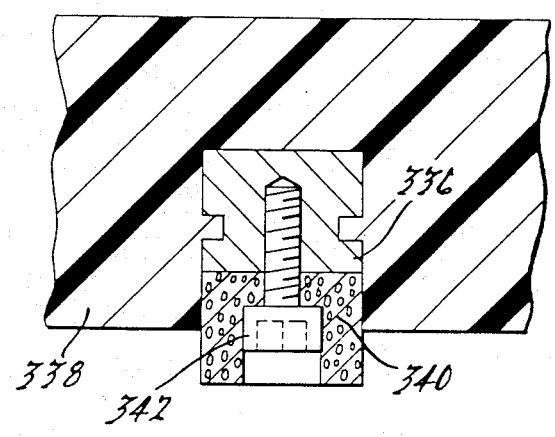

FIG. 11 illustrates a modification of the method illustrated in FIG. 8. A metal plug 336, is cast into the chamber 338. The standoff 340 may then be secured by a screw 342 into the metal plug.

Methods of isolating and locating a leak in testing container for leaks are illustrated in FIG. 12 and 13. Upon the initial detection of a leak, the leak may be localized by systematically testing individual zones of the chamber for the trace gas. The method of detecting a leak described previously is halted, while maintaining a vacuum in the chamber and pressurized test gas inside the part tested. Purified air at a higher absolute pressure than the chamber pressure is introduced at each zone to "sweep" that zone, causing any trace gas to be drawn through the outlet in that zone to be detected. Zone inlet and outlet channels may be formed into the chamber when the chamber is made or may be defined merely by the inlet and outlet ports. Each of the zones is tested for the test gas, once the zone of the leak is identified, the location of the leak as been narrowed to that zone. The more zones that are provide, the more accurately the location of the leak may be determined. Non-porous standoffs may be provided to increase zoning efficiency, such as rib type standoffs parallel to the flow path of the zone or near the inlet and outlet ports of the zones outside of the flow path. Standoffs must allow the flow of air between the inlet and outlet ports of each zone.

FIG. 12 illustrates one method of locating the particular zone in which the leak occurred. Purified air enters at inlet 400 and controllably introduce into a particular zone by an inlet valve 402. Inlet junction 424 allows the air to flow to other inlets at other zones. The rate of flow of the purified air into a particular zone is regulated by the flow control 404. The flow control 404 may be regulated manually or automatically. When the inlet valve 402 is open, the regulated air will flow into the chamber 406 through the zone inlet port 408. An inlet channel 410 which runs the width of the zone may be molded in the chamber 406 to facilitate the sweeping of the entire width of the zone. The purified air will flow throughout the zone defined by the chamber surface, the surface of the part tested 411, the inlet port 408 and the outlet port 412. An outlet channel 414 which runs the width of the zone may be molded into the chamber. A vacuum is drawn through the outlet port 412 by a test vacuum pump 416 to maintain the test pressure differential across the part 410. The pressure differential will force the test gas through the leak which will then flow through the zone and through the outlet port 412. The output of the vacuum pump 416 is exposed to a gas sensor which will detect the presence of the test gas. An outlet valve 418 is located before the outlet junction 420 which connects all of the outlets of all of the zones, illustrated at 422, to the vacuum pump 416. Thus, the vacuum pump 416 may be in continuous operation while the individual zones are sequentially opened to the vacuum pump 416 and sensor. By opening valves 402 and 418 for a given zone, that zone is tested for traces of the test gas. The valves 402 and 418 may then be closed for the first zone and opened for the next zone and continued sequentially until all zones have been tested.

An alternative method for controlling the method described above is by means of a sole control valve 402. The flow control 404 would be located before the inlet junction 424. No outlet control valve 418 would be required. Only the inlet control valve 402 for the zone to be tested is opened so that the only flow through the vacuum pump and the sensor would be through the zone tested. This method is quickly and easily conducted.

Another method of localizing a leak is illustrated in FIG. 13. A flow control 426 is provided in the purified air inlet 428 which leads to the inlet port 430. An inlet channel 432 which runs the width of the zone may be molded into the chamber 434. The purified air would flow through the zone across the part tested 436, and through the outlet port 438. An outlet channel 440 which runs the width of the channel may be molded into the chamber 434. The path of the air flow is controlled by a 3-way valve 442. When a particular zone is being tested, the valve 442 directs the outlet flow through the sensor vacuum pump 444 to the sensor. The flow through the sensor vacuum pump 444 is controlled by a flow control 446. When a particular zone is not being tested, the valve 442 is activated to direct the flow through a non-sensing vacuum pump 448, the output of which is exhausted. The sensing inlet 450 illustrates the outlet flow from each of the other zones in the test mode (valve 442 opened to the sensing vacuum pump). The exhaust inlet 452 illustrates the outlet flow from each of the other zones not in the test mode (valve 442 opened to the exhaust vacuum pump). In this method, each of the zones is experiencing a flow of purified air, and the zones may easily be sequentially tested.

An option in the leak zone detection cycle is, after detection of a general leak, complete scavenging of the chamber and outlet lines while retaining the gas in the fuel tank. Then the valves 418 or 442 are opened in sequence to the sense pump.

Although the process and apparatus described herein involves the testing of fuel tanks, the process may have many other useful applications. Fluid containing vessels could be for leaks such as in the fuel system of automobiles, in particular fuel pumps, fuel filters, and fuel pressure regulators. Other possible items in the automotive industry that could be tested would be wheels, transducers, vacuum modulators or spark plugs. Each of these could be quickly and accurately tested with the use of a high pressure system utilizing a halogen test gas.

While it will be apparent that the preferred embodiments of the invention disclosed are well calculated to fulfill the objects, benefits or advantages of the invention, it will be appreciated that the invention is susceptible to modification, variation and change without departing from the proper scope or fair meaning of the subjoined claims.

What is claimed is:

1. A method for detecting leaks in a fuel tank comprising the steps of loading said fuel tank into a substantially rigid vacuum chamber substantially conforming to the shape of said fuel tank;
   closing and sealing said vacuum chamber;
   sealing all ports of said fuel tank;
   evacuating said vacuum chamber;
   scavenging said vacuum chamber with filtered air;
   reducing the air pressure in said vacuum chamber rapidly by a first high-volume vacuum means, comparing the pressure in said vacuum chamber with preset pressure of a second high-sensitivity vacuum means, and opening said second vacuum means to said vacuum chamber and closing said first vacuum means to said vacuum chamber when the pressure in said vacuum chamber is equal to the pressure in said second vacuum means;
   injecting a pressurized test gas into said fuel tank; and
   sensing the output of said second vacuum means with a test gas sensing means.

2. The method defined in claim 1 further comprising steps:
   continuously measuring the air pressure inside said portion of a fluid containing chamber and indicating a gross leak upon detection of a lessening of the air pressure inside said portion of a fluid containing chamber beneath of predetermined pressure.

3. The method defined in claim 1 further comprising the steps:
   measuring the air flow into said sensing means, and indicating a gross leak upon detection of a flow of air in excess of a predetermined amount.

4. The method defined in claim 1 further comprising the step:
   filtering air exiting said vacuum chamber and said portion of a fluid containing chamber.

5. The method defined in claim 1 further comprising the step:
   collecting and exhausting air exiting said vacuum chamber and said portion of a fluid containing chamber.

6. The method defined in claim 1 wherein:
   said sensing means is exposed only to filtered air when said sensing means is not exposed to said vacuum chamber.

7. The method defined in claim 1 wherein: said test fluid mixture is injected by means of a high pressure nozzle.

8. The method defined in claim 1 further comprising the step of:
   flushing said test gas from said fuel tank by injecting purified pressurized scavenge fluid into said fuel tank.

9. A method for detecting leaks in a portion of a fluid containing chamber in an apparatus containing a vacuum chamber having a rigid interior, comprising the steps of:
   loading said portion of a fluid containing chamber into said vacuum chamber;
   closing and sealing said vacuum chamber;
   sealing all ports of said portion of a fluid containing chamber;
   injecting filtered air into said vacuum chamber;
   reducing the air pressure in said vacuum chamber to a test pressure by vacuum means;
   injecting a test fluid mixture into said portion of a fluid containing chamber;
   sensing the output of said vacuum means with a test fluid detecting means;
   upon detection of a leak, sequentially testing zones of the vacuum chamber for said leak by, for each zone, introducing into one end of said zone purified air at a pressure above said test pressure, causing a flow of air through said zone, outletting said flow of air at the opposite end of said zone through said vacuum means, and sensing the outlet of said vacuum means with said sensing means; and removing said portion of a fluid containing chamber from said vacuum chamber.

10. A method for detecting leaks in a portion of a fluid containing chamber in an apparatus containing a vacuum chamber having a rigid interior, comprising the steps of:

loading said portion of a fluid containing chamber into said vacuum chamber;

closing and sealing said vacuum chamber;

sealing all ports of said portion of a fluid containing chamber;

injecting filtered air into said vacuum chamber;

reducing the air pressure in said vacuum chamber rapidly by a first high-volume vacuum means;

comparing the pressure in said vacuum chamber with a preset pressure of a second high-sensitivity vacuum means;

opening said second vacuum means to said vacuum chamber and closing said first vacuum means to said vacuum chamber when the pressure in said vacuum chamber is equal to the pressure in said second vacuum means;

injecting a test fluid mixture into said portion of a fluid containing chamber;

sensing the output of said vacuum means with a test fluid detecting means; and removing said portion of a fluid containing chamber from said vacuum chamber.

11. A method for detecting leaks in a portion of a fluid containing chamber comprising the steps of:

loading said portion of a fluid containing chamber into a vacuum chamber;

closing and sealing said vacuum chamber;

sealing all ports of said portion of a fluid containing chamber;

injecting filtered air into said vacuum chamber;

reducing the air pressure in said vacuum chamber to a test pressure by vacuum means;

injecting a test fluid mixture into said portion of a fluid containing chamber;

sensing the output of said vacuum means with a test fluid detecting means;

injecting scavenge air into said portion of a fluid containing chamber to remove said test gas mixture from said portion of a fluid containing chamber; and removing said portion of a fluid containing chamber from said vacuum chamber;

further comprising a scavenging procedure upon the detection of said test fluid by said sensor consisting of:

introducing filtered air into said vacuum chamber while maintaining the air pressure in said vacuum chamber below the ambient air pressure;

reducing the air pressure in said vacuum chamber to said test pressure; and rapidly introducing filtered air into said vacuum chamber.

12. A leak detecting apparatus for a portion of a fluid containing chamber containing at least two ports comprising:

a vacuum chamber have two portions, a stationary portion and a retractable portion, said vacuum chamber substantially conforming to the shape of said portion of a fluid containing chamber;

an inlet manifold and a vacuum manifold integrally formed within said vacuum chamber;

at least two reciprocable port seal assemblies insertable within said ports such that said fluid containing chamber is sealed to the flow of air;

a fluid containing chamber exhaust manifold disposed within one of said port seal assemblies;

a test fluid input means disposed within one of said port seal assemblies;

a fluid containing chamber scavenge air input means disposed within one of said port seal assemblies;

annular means for sealing said port seal assemblies at least partially inserted within said ports, said annular means disposed on said port seal assemblies;

pneumatic means for reciprocating said retractable portion from said stationary portion;

pneumatic means for reciprocating said port seal assemblies, inserting said port seal assemblies into said ports;

a rapid vacuum means to quickly reduce the pressure in said vacuum chamber to a given test pressure connected to said vacuum manifold;

a testing vacuum means to maintain the said test pressure in said vacuum chamber during testing connected to said vacuum manifold;

air inlet means for introducing air into said vacuum chamber, said air inlet means connected to said inlet manifold; and test fluid detecting means exposed to the outflow of said testing vacuum means.

13. A leak detecting apparatus for a portion of a fluid containing chamber containing at least two ports comprising:

a vacuum chamber having two portions, a stationary portion and a retractable portion, said two portions being rigid, said vacuum chamber configured to enclose and substantially conform to said portion of a fluid containing chamber, creating and maintaining a substantially uniform and narrow space between said vacuum chamber and said portion of a fluid containing chamber, said portion of a fluid containing chamber further being supported along the surface of said portion of a fluid containing chamber in said vacuum chamber;

port seal assemblies insertable within said ports, sealing said portion of a fluid containing chamber when inserted therein;

means for inputting a test fluid into said portion of a fluid containing chamber disposed within one of said port seal assemblies;

means for reciprocating said retractable portion from said stationary portion;

vacuum means pneumatically connected to said vacuum chamber for reducing the pressure in said vacuum chamber;

air inlet means for introducing air into said vacuum chamber; and test fluid detecting means exposed to said vacuum means.

14. The apparatus described in claim 13 further comprising:

a support means to support said apparatus;

at least one test unit removal rod slidably disposed within said retractable portion and having a removal position, said rod being of a length greater than the sum of the thickness of said retractable portion and the distance between said retractable portion in said removal position and said support means, said rod mechanically contacting said support means at the base end of said rod when in said removal position, the end of said rod opposite said base end limiting the movement of said portion of a fluid containing chamber in said removal position; and annular sealing means disposed within said retractable portion and slidably engaging said rod, said annular sealing means sealing said vacuum chamber.

15. The apparatus described in claim 13 further comprising:

at least one knock-out assembly disposed in said vacuum chamber, said knock-out assembly comprising a reciprocable knock-out piston, means for reciprocating said piston, and annular sealing means, said piston having a position extended inward relative to the inside of said vacuum chamber into said vacuum chamber and contacting said portion of a fluid containing chamber in said extended position, and said annular sealing means sealing said vacuum chamber.

16. The apparatus described in claim 13 further comprising:

annular means disposed on said port seal assemblies for sealing said port seal assemblies in said ports, and at least one port assembly further comprising an adjustable mounting bracket mechanically connected to said vacuum chamber, and a port shaft pivotal within said vacuum chamber relative to a longitudinal axis defined by said port shaft and axially translatable about said axis.

17. The apparatus described in claim 16 wherein:

said port assembly contains a flexible diaphragm connecting said mounting bracket and said port shaft sealing said vacuum chamber.

18. The apparatus described in claim 13 further comprising:

a plurality of pairs of air inlets and outlets through said vacuum chamber, each pair of an inlet and outlet defining the length of a given zone, said zone further being defined by the fluid space between the inner surface of said vacuum chamber and the outer surface of said portion of a fluid containing chamber when said retractable portion engages said stationary portion;

means for introducing purified air through each of said inlets;

means for selectively connecting each of said outlets to said vacuum means;

means for selectively controlling the connection of said outlets to said vacuum means, establishing a flow between inlets and outlets in selected zones.

19. The apparatus described in claim 18 further comprising:

means for selectively controlling said introduction of purified air through each of said inlets.

20. The apparatus described in claim 18 wherein said vacuum means comprises a first vacuum means and a test vacuum means having an inlet and an outlet, wherein:

each of said outlets is connectable to said test vacuum means;

said means for selectively controlling the connection of said outlets to said vacuum means selectively and individually connects each of said outlets to said inlet of said test vacuum means; and said test fluid detecting means is connected to said outlet of said test vacuum means.

21. The apparatus described in claim 13, further comprising:

a safety valve located between said vacuum means and said vacuum chamber, said safety valve adapted to rupture when exposed to air pressure less than a preset test pressure.

22. The apparatus of claim 13 further comprising:

means for introducing scavenge air into said portion of a fluid containing chamber.

* * * * *

UNITED STATES PATENT AND TRADEMARK OFFICE
CERTIFICATE OF CORRECTION

PATENT NO. : 4,791,805   Page 1 of 3

DATED : December 20, 1988

INVENTOR(S) : Donald C. Gates

It is certified that error appears in the above-identified patent and that said Letters Patent is hereby corrected as shown below:

Abstract line 7 on title page, delete "tank" after --The--

Column 3, Line 67, delete "cannot" after --leak--

Column 4, Line 47, "al" should be --a--

Column 6, Line 7, "of" should be --for--

Column 6, Line 9, "of" should be --for--

Column 6, Line 22, insert "tank" after --fuel--

Column 6, Line 63, "trances" should be --traces--

Column 7, Line 6, "it" should be --its--

Column 7, Line 21, "lowerd" should be --lowered--

Column 7, Line 37, "changer" should be ---chamber--

Column 7, Line 41, "an" should be --and--

UNITED STATES PATENT AND TRADEMARK OFFICE
CERTIFICATE OF CORRECTION

PATENT NO. : 4,791,805

DATED : December 20, 1988

INVENTOR(S) : Donald C. Gates

It is certified that error appears in the above-identified patent and that said Letters Patent is hereby corrected as shown below:

Column 7, Line 54, "case" should be --cast--

Column 8, Line 35, insert "of" after --embodiment--

Column 8, Line 55, "punch" should be --push--

Column 9, Line 5, "it" should be --It--

Column 9, Line 54, "fiber" should be --filter--

Column 10, Line 2, "scavenged value" should be --scavenge value--

Column 10, Line 31, "enetering" should be --entering--

Column 11, Line 40, "and" should be --are--

Column 12, Line 13, "anular" should be --annular--

Column 12, Line 15, "in" should be --into--

Column 12, Line 27, "an" should be --and--

UNITED STATES PATENT AND TRADEMARK OFFICE
CERTIFICATE OF CORRECTION

PATENT NO. : 4,791,805

DATED : December 20, 1988

INVENTOR(S) : Donald C. Gates

It is certified that error appears in the above-identified patent and that said Letters Patent is hereby corrected as shown below:

Column 12, Line 29, delete "the" (2nd occurrence)

Column 12, Line 42, "fictional" should be --frictional--

Column 14, Line 28, "provide" should be --provided--

Column 14, Line 47, "in" should be --into--

Column 16, Line 19, Claim 2, "of" should be --a--

Signed and Sealed this

Fifth Day of March, 1991

Attest:

HARRY F. MANBECK, JR.

Attesting Officer

Commissioner of Patents and Trademarks